Aug. 8, 1967 S. H. HOLT ET AL 3,334,931
TWO-WAY AUTOMATIC LOCKING AND FRICTION DEVICE
Filed Aug. 19, 1964
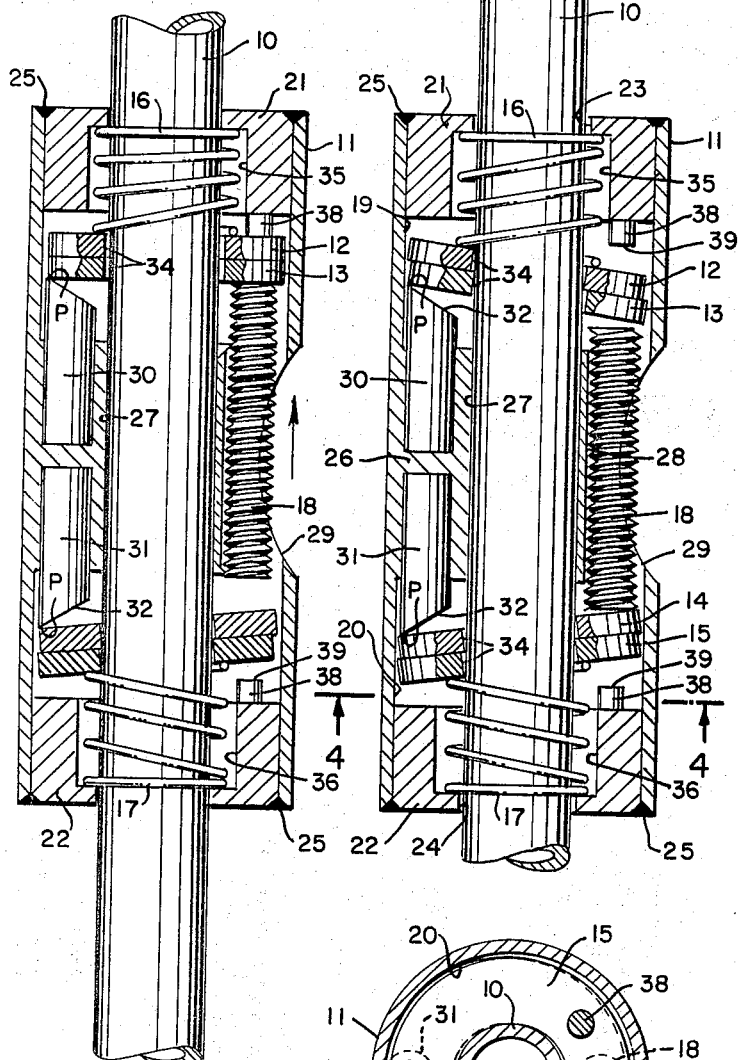
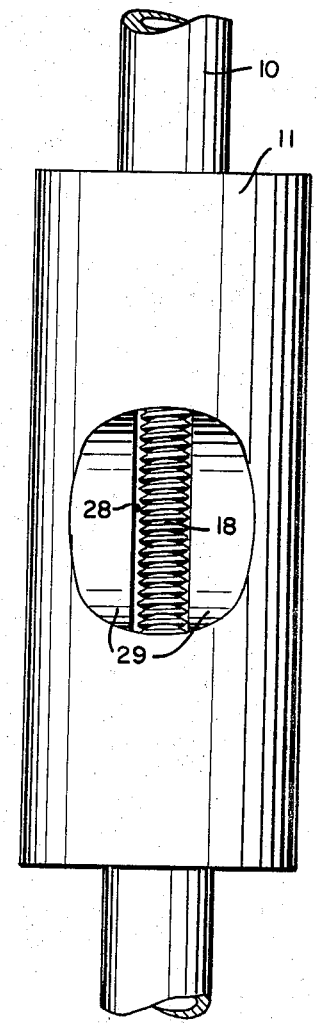
INVENTORS
SHERMAN H. HOLT
JACK R. HOLT
BY
Mandeville and Schweitzer
ATTORNEYS 3,334,931
TWO-WAY AUTOMATIC LOCKING AND
FRICTION DEVICE
Sherman H. Holt, 847 N. Marion St. 74115, and Jack
R. Holt, 515 N. Union St. 74127, both of Tulsa, Okla.
Filed Aug. 19, 1964, Ser. No. 390,622
10 Claims. (Cl. 287—58)

ABSTRACT OF THE DISCLOSURE

The invention is directed to a telescoping structure which includes a sleeve normally locked to a rod by oppositely canted plates but which sleeve may be selectively displaced along said rod when unlocked. Displacement of the sleeve, when unlocked, may be had only in one direction at a time by virtue of an elongated unlocking control element carried in the sleeve between the opposing faces of the canted plates.

---

The present invention relates to telescoping assemblies and locking devices therefor, and is directed more particularly to improvements in such assemblies and devices, providing a simplified yet reliable and effective two-way friction locking arrangement for adjustable, telescoping assemblies.

Many types of devices have been employed in the past to secure an outer telescoping member to an inner rod in a desired, adjusted position. Typically, these devices when unlocked for adjustment are unlocked for bidirectional axial motion of the telescoping member. In contrast, the present invention provides a new and improved two-way locking device which, in addition to having other significantly advantageous characteristics, allows only one-way axial movement when the telescoping member is adjusted. Furthermore, in conjunction with its actual adjustment, the new mechanism provides for improved and advantageous control of the direction in which an outer member or sleeve may be displaced relative to an inner member or rod.

In accordance with the invention, the telescoping member is generally in the form of a sleeve which is normally positively locked against displacement, relative to the rod, in either direction by a unique arrangement of oppositely canted, spring biased locking plates carried in the sleeve and in surrounding relation with the rod. Adjustment of the new mechanism is effected by manipulation of a control bar disposed between the oppositely canted plates, which bar is bidirectionally shiftable from a neutral locking position to unlock the sleeve for one-way displacement, in the direction in which the control bar has been shifted. In accordance with one aspect of the invention, the mechanism will be locked against relative axial displacement in at least one direction at all times by the constant canting of at least one of the locking plates, and will be locked against displacement in both axial directions when the locking plates are oppositely canted.

As will be made apparent, the advantageous operation of the new mechanism is obtained with a bare minimum number of elements which have been uniquely arranged to cooperate in a new, useful, and advantageous manner. The new device finds great utility in the adjustable legs of tripods, easels, music and microphone stands, and like telescoping, adjustable structures.

For a more complete understanding of the invention and its attendant advantages, reference should be made to the following detailed description taken in conjunction with the accompanying drawing, in which:

FIG. 1 is a fragmentary longitudinal cross-sectional view of the new and improved telescoping mechanism embodying the principles of the invention, with the telescoping member being locked against movement in both directions by oppositely canted locking plates;

FIG. 2 is a fragmentary longitudinal cross-sectional view of the new mechanism showing the telescoping member being unlocked for upward movement while being locked against downward movement;

FIG. 3 is a side elevational view of the new mechanism; and

FIG. 4 is a cross-sectional view taken along line 4—4 of FIG. 1.

Referring to FIG. 1, a preferred embodiment of a telescoping structure generally includes an inner cylindrical rod 10, an outer cylindrical housing sleeve 11 telescopingly received over the rod, sets of upper locking plates 12, 13 and lower locking plates 14, 15, oppositely canted by springs 16, 17 to securely lock the housing sleeve and the rod against relative movement, and a control bar 18 for selectively uncanting either of the sets of locking plates to accommodate relative movement of the sleeve and rod in one direction.

In the illustrated form of the device, the housing sleeve 11 defines upper and lower open cavities 19, 20, respectively, at its upper and lower ends, which cavities are closed by recessed end caps 21, 22 having openings 23, 24 to accommodate the free passage of the rod 10. The end caps may be secured to the housing sleeve by welds 25 or by other suitable means such as screws, threaded connections, or the like.

As shown in the drawing, the housing sleeve 11 has an intermediate body portion 26, in which is provided a central bore 27, of a diameter slightly greater than that of the rod 10, and an auxiliary bore 28 extending therethrough and in communication with the upper and lower cavities 19, 20. The auxiliary bore 28 is adapted to receive and slidably support the control bar 18, which advantageously may be threaded or knurled for ready manual gripping. In conjunction with the foregoing, a dished recess 29 (FIG. 3) is formed in the central body portion of the housing and extends into the bore 28 to provide convenient access to the control bar 18 from the exterior of the housing sleeve 11.

A pair of pivot posts 30, 31, advantageously having sloping, relieved pivot surfaces 32, are anchored in the housing body portion and extend into each of the cavities. As shown in FIGS. 1 and 4, the pivot posts, in the specific mechanism of the illustration, are supported diametrically opposite the control bar 18.

In accordance with the invention, the opposing pairs of locking plates 12–13 and 14–15 are supported for pivotal movement about the posts 29, 30 and in generally surrounding relation with the rod 10. In the preferred, illustrated embodiment, the locking plates are in the form of circular, washerlike elements having internal bores 33, slightly greater than the diameter of the rod 10, the walls of which bores provide frictional gripping surfaces 34. It is to be understood, however, that in certain applications the plates as well as the rod may be other than circular, the important relationship between the two elements being the loose, non-locking fit of the frictional gripping surfaces 34 with the rod 10 when the plate is perpendicular therewith, which loose fit may be converted to a unidirectional, frictional locking grip by the canting of the locking plate. Moreover, to vary the magnitude of frictional locking forces in certain applications, it may be found desirable or appropriate to use more than two plates at each end or to use only a single plate at each end.

As shown in FIG. 1, the locking plates 12–15 are normally pivoted inwardly about the pivot points P into a canted, frictionally locking relationship with the rod by the springs 16, 17, which are seated in the end cap recesses 35, 36, respectively. In accordance with well established principles, a canted plate acting between a rod and a sleeve provides unidirectional frictional locking; that is to say, movement of the sleeve relative to the rod will be prohibited in one direction, the direction being opposite that in which the locking plate is pivoted about the fixed point P, while movement of the sleeve will be accommodated in the other direction. This general type of one-way frictional locking is common in the art.

As an important aspect of the present invention, two-way locking of the sleeve and the rod is achieved by providing oppositely canted locking plates. Thus, in the fully locked position of the mechanism shown in FIG. 1, the sleeve is locked against upward movement by the downwardly (inwardly) canted upper plates 12, 13 and is simultaneously locked against downward movement by the upwardly (inwardly) canted lower plates 14, 15. It should be understood, that in the absence of the lower plates 14, 15, the sleeve 11, although being locked against upward movement by the plates 12, 13 would be movable therethrough in the downward direction. Likewise, in the absence of the upper plates 12, 13, the sleeve 11 would be movable upwardly through the plates 14, 15 while being locked thereby against downward movement.

As an important aspect of the invention, selective unlocking control of the telescoping mechanism is provided by the sliding control bar 18. The length of the control bar is approximately equal to the distance between the innermost oppositely canted locking plates 13, 14, as shown in FIG. 1, and in the absence of external control forces on the control element, it will be maintained in a neutral locking position (FIG. 1), by the balanced opposition of the spring-biased upper and lower locking plates. Release of the sleeve 11 for one-way adjustment (upward, for example, as shown in FIG. 2) in accordance with the principles of the invention, may be had by displacing the bar in the same (or upward) direction to move the upper locking plates 12, 13 into a substantially perpendicular, frictionally disengaged, unlocked relationship with the rod 10.

As shown in FIGS. 2 and 4, spaced stops 37, 38 are included in the end covers 21, 22 on the opposite side of the rod from the pivot posts 30, 31 and are adapted to limit the pivotal movement of the plates to the aforesaid, substantially perpendicular, unlocked position. Accordingly, the faces 39 of the stops are spaced from the pivot points a distance equal to the thickness of a set of locking plates.

Wtih the control bar 18 displaced against the force of the biasing spring in the desired direction of adjustment (upward as shown in FIG. 2, for example), the sleeve 11 may be freely moved in an upward direction but not downward due to the unidirectional locking action of the lower plates. The inverse operation may be had for downward adjustment, as should be understood. Removal of the adjusting force from the control element will cause the sleeve to be automatically, bidirectionally locked in the adjusted position by the return of the temporarily uncanted locking plates to a canted, locking position through the action of the appropriate biasing spring. This in turn will center the control element in the neutral position, as will be understood.

The new and improved telescoping assembly is extremely reliable and unusually simplified in construction. It provides ready and secure final adjustment, that is adjustment which is locked against displacement in two directions. Additionally and importantly, the new mechanism provides desirable safety during the actual adjusting of the telescoping member, because, in accordance with the principles of the invention, the device can be released for movement in only one direction at a time.

The telescoping assembly of the invention, in addition to having superior and advantageous operating characteristics relative to telescoping assemblies of known design, includes a number of advantageous structural features which provide for a smooth, free action when the device is released for adjustment. The overall device utilizes a relatively minimum number of parts, which enables the device to be manufactured at a relatively low cost, and the nature of the component elements is such as to provide a rugged, durable mechanism capable of a long operating life in all kinds of service.

The device can be made in very compact forms, because all of the operating parts may be contained within a cylindrical housing sleeve which is just slightly larger in diameter than the locking plates or washers. For convenience, however, it is advantageous in many instances to proportion the housing to fit comfortably within the grip of the hand, with the thumb bearing upon the control element and the fingers encircling the back of the housing. In a device of these proportions, the housing may have a diameter of about an inch and a length of about three inches.

One of the significant practical advantages of the new device resides in the fact that the control element 18 is so arranged that manual actuation thereof in a given direction releases the housing for sliding movement in that same direction. This provides for a very natural and convenient manual manipulation of the housing to an adjusted position. At the same time, the axial movement of the control element advantageously is such that only one set of locking plates at a time may be released.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

We claim:
1. A telescoping structure comprising
 (a) an elongate rod-like member of predetermined cross-section and definitive of a major axis,
 (b) housing sleeve means including first and second pivot surfaces received over said rod-like member and having closed cavities at opposite ends thereof,
 (c) first and second locking plates disposed in said cavities, means biasing said locking plates to oppositely cant said plates about said pivot surfaces into locking positions whereby said sleeve and said rod-like member are locked against relative movement in either direction by said first and second locking plates,
 (d) unitary elongated control means carried in said housing sleeve means,
 (e) said elongated unlocking control means being of a length less than the distance between the opposed faces of said locking plates and including control surfaces selectively engageable with said opposing faces of said oppositely canted plates,
 (f) said control surfaces being selectively axially displaceable along an axis parallel to said major axis into engagement with either said first or second locking plate to uncant only one or the other of said first and second locking plates,
 (g) whereby said sleeve may be moved freely solely in the direction of the displacement of said control surfaces, said sleeve being restrained from movement in the opposite direction by the canted locking plate.

2. A telescoping structure in accordance with claim 1, in which
 (a) said biasing means comprises spring means urging said locking plates into said canted positions.

3. A telescoping structure in accordance with claim 2, in which
 (a) said unitary elongated control means is normally urged into a neutral or locking position by said spring means acting through said locking plates.

4. A telescoping structure in accordance with claim 1, in which
 (a) said control means comprises a bar-like element.

5. A telescoping structure in accordance with claim 1, in which
   (a) said sleeve means is provided with a recess to expose and provide ready access to said control means.

6. A telescoping structure in accordance with claim 1, in which
   (a) a plurality of locking plates is included in each of said cavities.

7. A telescoping structure in accordance with claim 1, which includes
   (a) said pivot surfaces are supported in said housing in positions diametrically opposite said unitary elongated control means.

8. A telescoping structure in accordance with claim 7, which includes
   (a) stop means supported in said housing and limiting the unlocking movement of said locking plates to positions substantially perpendicular with said rod-like member.

9. A two-way locking sleeve for selective one-way displacement along a longitudinal rod member in either of two directions, comprising
   (a) a housing fitting slidingly over said rod member and including a pair of spaced pivot surfaces,
   (b) a first one-way locking means including at least one canted locking plate disposed toward one end of said housing and normally preventing relative displacement of said housing and said rod member in a first predetermined direction,
   (c) a second one-way locking means including at least one canted locking plate disposed toward the other end of said housing and normally preventing relative displacement of said housing and said rod member in a second direction, and
   (d) the locking plates of said first and second one-way locking means being oppositely canted,
   (e) spring means positioned between said housing and said locking plates to urge said plates against said pivot surfaces and into said canted positions,
   (f) selectively actuable control means in the form of an elongate bar disposed between said locking plates in a neutral position,
   (g) said housing being positively locked against displacement in either direction when said control means is in said neutral position,
   (h) said control bar being supported in said housing for axial displacement from said neutral position into operative unlocking association with one or the other of said locking means,
   (i) said control bar is biased into said neutral position by said spring means and is selectively, axially displaceable from said neutral position to uncant said locking plates,
   (j) whereby said housing may be displaced relative to said rod member in the predetermined direction of control bar displacement from said neutral position while being locked against relative displacement in the opposite direction of said control bar displacement.

10. A locking sleeve in accordance with claim 9, which includes
   (a) stop means to limit the unlocking movement of the locking plates to a position substantially perpendicular to said rod member.

References Cited

UNITED STATES PATENTS

| | | |
|---|---|---|
| 836,303 | 11/1906 | Christensen _____ 287—58 X |
| 2,090,550 | 8/1937 | Pilblad _____ 287—58 X |
| 2,806,723 | 9/1957 | Fairclough. |
| 2,888,284 | 5/1959 | Holmberg _____ 287—58 X |
| 2,907,598 | 10/1959 | Hart _____ 287—58 |

FOREIGN PATENTS

| | | |
|---|---|---|
| 426,880 | 4/1935 | Great Britain. |

CARL W. TOMLIN, *Primary Examiner.*

T. F. CALLAGHAN, *Assistant Examiner.*